United States Patent Office 3,184,483
Patented May 18, 1965

3,184,483
UNSYMMETRICAL 4-HALOGENO-4',4"-DIARYL-AMINO-TRIPHENYL-METHANE DYESTUFFS AND PROCESS FOR THEIR MANUFACTURE
Ferdinand Quint and Gustav Schäfer, both of Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 26, 1962, Ser. No. 190,261
Claims priority, application Germany, May 3, 1961,
F 33,831
10 Claims. (Cl. 260—393)

The present invention relates to unsymmetrical 4-halogeno-4',4"-diarylamino-triphenylmethane dyestuffs and to a process for their manufacture; more particularly it relates to dyestuffs corresponding to the following general formula

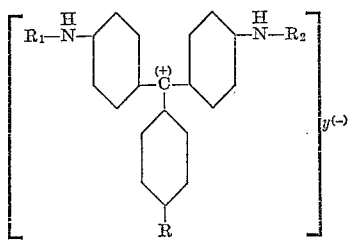

wherein $R_1$ represents an aromatic radical which is substituted in meta- or para-position to the imino group and which may contain further substituents, $R_2$ stands for an aromatic radical which may carry any desired substituent and is different from $R_1$, R stands for a halogen atom and $y^{(-)}$ means the anion of an acid radical.

Processes are known for reacting p-trihalogeno-triphenylmethyl carbinols with aromatic amines and the hydrochloric acid salts thereof (cf. Ber. 38 (1905), page 587). With this method, all three halogen atoms in the para-positions are exchanged for arylamine radicals and dyestuffs of the p-triarylamino-triphenylmethane series are obtained. The same is the case when reacting in this manner p-trimethoxy-triphenylmethyl carbinols (Ber. 37 (1904), page 2870), p-triamino-triphenyl carbinols such as p-rosaniline (cf. Fierz-David, Künstliche organische Farbstoffe, volume I (1926), pages 262/263) or the simple or complex salts of p-trihalogeno-triphenyl carbinols (cf. Belgian Patent 561,613) instead of p-trihalogeno-triphenylmethyl carbinols. By these known methods, however, the exchange of only one or two substituents in the para-position and the preparation of monoarylamino compounds or diarylamino compounds of the triphenylmethane series are not possible.

Now we have found, that unsymmetrical 4-halogeno-4',4"-diarylamino-triphenylmethane dyestuffs can be prepared by condensing 1 mol of the complex compound of a 4,4',4"-trihalogeno-triphenylmethyl halide and aluminum chloride, ferric chloride or boron trifluoride, in the presence of an inert organic solvent, first with either 1 mol of a primary arylamine which is substituted in meta- or para-position and which may contain further substituents, at a temperature within the range of about 80° C. to 130° C., preferably 95° C. to 110° C., or with 2 mols of a primary arylamine which is substituted in meta- or para-position and which may contain further substituents, at a temperature within the range of about 30° C. to 80° C., preferably about 50° C. to 60° C., to obtain the complex metal salt of the corresponding 4,4'-dihalogeno-4"-arylamino - triphenylmethane compound and, after an intermediate isolation for removing the excess arylamine, in case the reaction has been carried out with 2 mols of a primary amine, further condensing it at a temperature within the range of about 120° C. to 130° C. with 2 mols of another primary arylamine which may carry any desired substituent in the aromatic nucleus and is different from the arylamine used in the first step, to obtain the corresponding 4-halogeno-4',4"-diarylamino-triphenylmethane compound. After pouring the reaction mixture so obtained into dilute non-oxidizing mineral acid such as dilute hydrohalic acid or sulfuric acid for hydrolyzing the complex metal salt and dissolving out the excess amine and after removing the inert organic solvent, the corresponding unsymmetrical 4-halogeno-4',4"-diarylamino-triphenylmethyl carbonium salt is obtained in an excellent purity and almost quantitative yield.

The intermediate isolation of the complex compound formed of 4,4'-dihalogeno-4"-monoarylamino-triphenylmethyl halide and aluminum chloride, ferric chloride or boron fluoride, which is required in the case of a reaction in the first step with 2 mols of a primary aryl-amine, is carried out by pouring the reaction mixture containing in addition to the said complex compound primary aromatic amine in excess and an inert organic solvent into dilute non-oxidizing mineral acid such as dilute hydrohalic acid or dilute sulfuric acid and removing the organic solvent, for example by blowing it off with steam. The complex compound is hydrolyzed to the 4,4'-dihalogeno-4"-monoarylamino-triphenylmethyl-carbonium salt or to the corresponding 4,4'-dihalogeno-4"-monoarylamino-triphenylmethyl carbinol. It depends upon the primary amine used in the first step whether in the hydrolysis the said carbonium salt or the corresponding carbinol is formed. The carbonium salt or corresponding carbinol so isolated is then condensed in the second step, in the manner described above, in the presence of an inert organic solvent, with 1 mol of aluminum chloride, ferric chloride or boron fluoride and 2 mols of a primary arylamine which may contain any desired substituent and is different from the primary arylamine used in the first step.

In the aforementioned process, the 4,4'-dihalogeno-4"-aryl-amino-triphenylmethane compound obtained in the first step may of course be isolated as a complex compound or, after a treatment with dilute non-oxidizing mineral acid and after elimination of the organic solvent used, in an almost quantitative yield as a simple salt, for example a halide, and the condensation may be completed later on as described above. In this case, the 4,4'-dihalogeno-4"-arylamino-triphenylmethyl halide or the complex compound thereof serves as the starting product for the preparation of the unsymmetrical 4-halogeno-4',4"-diarylamino-triphenylmethane compounds.

Suitable organic solvents are, for example, chlorobenzene, dichlorobenzene, trichlorobenzene, tetrachloroethane, nitromethane or nitrobenzene. Mixtures of such inert organic solvents may also be used.

The primary arylamines substituted in the meta- or para-position to the amino group which are reacted in the first step, may carry as substituents for example a halogen atom, an alkyl, aryl, hydroxy, alkoxy, phenoxy, phenyl-amino, β-hydroxyethylsulfone, trifluoromethyl, cyano, nitro, sulfonamide, sulfanilide, sulfonic acid ester or carboxylic acid ester group. These arylamines may carry in addition to the substituent in the meta- or para-position to the amino group further substituents in the aromatic nucleus, for example the aforementioned ones.

The complex compounds of 4,4',4"-trihalogeno-triphenylmethyl halides and aluminum chloride, and ferric chloride which are used as starting compounds, can be prepared in known manner by allowing the 4-halogeno-benzo-trihalides to act on excessive halogenobenzenes at a temperature within the range of about 50° to 60° C. in the presence of about the theoretical amount of aluminum chloride or ferric chloride and separating the crystallized complex metal salts from the isomeric compounds which remain dissolved in the excessive halogenobenzene and from small amounts of resin. The complex boron-trifluoride compounds can be prepared from the 4,4',4''-trihalogeno-triphenylmethyl halides and boron trifluoride.

For the purpose of simplification, the complex metal salt of a 4,4',4''-trihalogeno-triphenylmethyl halide prepared from a 4-halogenobenzo-trihalide in the aforementioned manner can be condensed in the manner described above, after separation of the excess halogenobenzene in which the isomeric compounds and little amounts of resin are dissolved, without drying, in the same reaction vessel, first with 1 mol of an arylamine carrying a substituent in meta- or para-position and then with 2 mols of another arylamine which is substituted or not in the aromatic nucleus.

Since the preparation of 4-halogeno-4',4''-diarylamino-triphenylmethane compounds containing two different arylamine radicals was hitherto impossible, the present process represents a considerable advance in the art.

The unsymmetrical 4-halogeno-4',4''-diarylamino-triphenylmethyl carbonium salts are dyestuffs which are suitable for the dyeing of synthetic fibers, more especially of polyacrylonitrile, and which, when being subsequently sulfonated, dye wool and silk bright green tints possessing good properties of fastness. They may also be used for the preparation of 4,4',4''-triarylamino-triphenylmethane compounds since the remaining halogen atom may be exchanged for the radical of an aromatic amine. Thereby, it is for the first time possible to prepare rosaniline blue dyestuffs having three different arylamine radicals.

It is surprising, even with regard to the 4,4'-dihalogeno-4''-arylamino-triphenylmethane compounds obtained as intermediary products in the process of the present invention which may be isolated, that these compounds can be obtained by the present process in an almost quantitative yield and in good purity.

The following examples serve to illustrate the invention but they are not intended to limit it thereto; the parts being by weight unless otherwise stated and the relationship of parts by weight to parts by volume being the same as that of the kilogram to the liter.

*Example 1*

(a) 52 parts of 4,4',4''-trichloro-triphenylmethyl-tetrachloroaluminate were suspended in 50 parts by volume of chlorobenzene and, after the addition of 10.7 parts of 1-amino-3-methylbenzene, the suspension was heated for 5 hours at 100° C. To the deep red melt, there were added 19 parts of aniline, the temperature was then raised to 120° C. and the whole was stirred for a further 5 to 6 hours whereby the melt turned green. The contents of the flask were then poured into dilute hydrochloric acid and the chlorobenzene was blown off. After suction-filtration and drying, the 4-chloro-4'-phenylamino-4''-(m-methylphenylamino)-triphenylmethyl chloride was obtained in the form of a green powder and in a yield of 95.3% of the theoretical value which dissolved in methanol and glacial acetic acid to give a green solution.

*Analysis.*—$C_{32}H_{26}N_2Cl_2$ (508.5):

|  | C | H | N | Cl |
|---|---|---|---|---|
| Calculated, percent | 75.5 | 5.12 | 5.5 | 13.88 |
| Found, percent | 75.2 | 5.5 | 5.9 | 13.52 |

When using instead of 4,4',4''-trichloro-triphenylmethyl-tetrachloro-aluminate an equimolecular amount of 4,4',4''-tribromo-triphenylmethyl-tetrachloroaluminate, 4,4',4''-triiodo-triphenylmethyl-tetrachloroaluminate or 4,4',4''-trifluoro-triphenylmethyl-tetrachloroaluminate and proceeding otherwise in the manner described above, there were obtained 4-bromo-4'-phenylamino-4''-(m-methylphenylamino)-triphenylmethyl chloride, 4-iodo-4'-phenylamino-4''-(m-methylphenylamino)-triphenylmethyl chloride or 4-fluoro-4'-phenylamino-4''-(m-methylphenylamino)-triphenylmethyl chloride in an equally good yield and purity.

When using instead of the aniline an equimolecular amount of 3-aminophenyl-β-hydroxyethylsulfone and operating otherwise as described in the first paragraph of this example, the dyestuff 4-chloro-4'-(m-methylphenylamino) - 4'' - (m - hydroxyethylsulfonylphenylamino)-triphenylmethyl chloride was obtained in a yield of 91% of the theoretical value in the form of a violet bronzing powder which dissolved in methanol and glacial acetic acid to give a green solution.

*Analysis.*—$C_{34}H_{32}O_3SN_2Cl_2$ (617):

|  | N | Cl | S |
|---|---|---|---|
| Calculated, percent | 4.53 | 11.5 | 5.18 |
| Found, percent | 4.5 | 11.3 | 4.8 |

(b) Instead of using the 4,4',4''-trichloro-triphenylmethyl-tetrachloroaluminate, the dyestuff was also directly prepared from the 4-chlorobenzo-trichloride in a one-pot process. For this purpose, 27.8 parts of 4-chlorobenzo-trichloride were added dropwise within 3 hours to a suspension of 17.8 parts of aluminum chloride in 90 parts by volume of chlorobenzene in such a manner that the temperature did not exceed 60° C. The mixture was stirred for 5 hours at a temperature within the range of 55° to 60° C., cooled to about 0° C. and the chlorobenzene in excess was separated by suction-filtration through a built-in glass frit from the 4,4',4''-trichloro-triphenylmethyl-tetrachloroaluminate crystallized in the form of orange lamellae. The product was after-washed with chlorobenzene, the glass frit was removed and the treatment was continued as described under (a).

(c) 53.5 parts of 1-amino-3-methylbenzene were slowly run into a suspension of 260 parts of 4,4',4''-trichloro-triphenylmethyl-tetrachloroaluminate and 150 parts by volume of chlorobenzene and the whole was stirred for 5 hours at 100° C. A deep red melt was obtained, which was poured into dilute hydrochloric acid and then subjected to distillation with steam. After suction-filtration, washing until neutralization was reached, and drying at a temperature within the range of 50° to 60° C., there was obtained in an almost theoretical yield the 4,4'-dichloro-4''-(m-methylphenylamino)-triphenylmethyl chloride in the form of red-brown tablets which dissolved in glacial acetic acid to give a yellowish red solution.

*Analysis.*—$C_{26}H_{20}NCl_3$ (452.5):

|  | C | H | N |
|---|---|---|---|
| Calculated, percent | 68.9 | 4.4 | 3.08 |
| Found, percent | 69.2 | 4.7 | 3.3 |

45.25 parts of the red dyestuff 4,4'-dichloro-4''-(m-methylphenylamino) - triphenylmethyl chloride prepared as described above were heated for 5 to 6 hours, at 120° C., with 14.7 parts of aluminum chloride, 18.6 parts of aniline and 40 parts by volume of chlorobenzene whereby the 4-chloro-4'-phenylamino-4''-(m-methylphenylamino)-triphenylmethyl chloride was formed. This product was treated in the manner described in paragraph (a).

Instead of the aluminum chloride, equimolecular amounts of ferric chloride or boron trifluoride were used with an equally good result.

The dyestuffs so obtained dye fibers or foils of polyacrylonitrile green tints possessing very good properties of fastness, more especially a very good fastness to light and wet processing.

*Example 2*

52 parts of 4,4',4''-trichloro-triphenylmethyl-tetrachloroaluminate, 10.7 parts of 1-amino-4-methylbenzene and 70 parts by volume of chlorobenzene were heated for 5 hours at 100° C. 25.4 parts of 1-amino-3-chlorobenzene were then added and the whole was heated for a further 5 hours at 120° C. The contents of the flask were then poured into dilute hydrochloric acid and the chlorobenzene was blown off. After suction-filtration and drying, the dyestuff 4-chloro-4'-(p-methylphenylamino)-4''-(m-chlorophenylamino)-triphenylmethyl chloride was obtained as a green powder which dissolved in methanol and glacial acetic acid to give a green solution.

The yield was almost quantitative.

When using instead of the 1-amino-3-chlorobenzene an equimolecular amount of 1-amino-2-chlorobenzene or 1-amino-4-chlorobenzene and proceeding in the manner described above, there were obtained with equally good yields the green dyestuffs 4-chloro-4'-(p-methylphenylamino)-4''-(o-chlorophenylamino)-triphenylmethyl chloride and 4-chloro-4'-(p-methylphenylamino)-4''-(p-chlorophenylamino)-triphenylmethyl chloride. When using instead of the 1-amino-3-chlorobenzene equimolecular amounts of 3-aminophenyl-β-hydroxyethylsulfone, there was obtained under the same working conditions the green dyestuff 4-chloro-4'-(p-methylphenylamino)-4''-(m-hydroxyethylsulfonylphenylamino)-triphenylmethyl chloride in a very good yield.

*Example 3*

20.1 parts of 4-aminophenyl-β-hydroxyethylsulfone were introduced at a temperature within the range of 90° to 100° C. into a suspension of 52 parts of 4,4',4''-trichloro-triphenyl-methyl-tetrachloroaluminate in 60 parts by volume of nitrobenzene and the mixture was heated for 5 to 6 hours at a temperature ranging from 100° to 105° C. 25.5 parts of 1-amino-3-chlorobenzene were then added and the mixture was heated for 5 hours at a temperature ranging from 120° to 125° C. After the nitrobenzene was blown off with steam from the melt rendered acid with dilute hydrochloric acid and after cautiously drying, a green color powder was obtained which dissolved in usual solvents to give a green solution and represented the 4-chloro-4'-(m-chlorophenylamino)-4'' - (p - hydroxyethyl - sulfonylphenylamino) - triphenylmethyl chloride.

*Example 4*

(a) 52 parts of 4,4',4''-trichloro-triphenylmethyl-tetrachloroaluminate, 50 parts by volume of chlorobenzene and 12.3 parts of 1-amino-4-methoxybenzene were stirred for 5 hours at 100° C. A deep red melt was obtained which was heated for 5 to 6 hours at 120° C. after the addition of 23.6 parts of 3-aminobenzonitrile whereby the color turned green. The melt was poured into dilute hydrochloric acid and the chlorobenzene was blown off.

The dyestuff 4-chloro-4'-(p-methoxyphenylamino)-4''-(m-cyanophenylamino)-triphenylmethyl chloride was now obtained in an excellent purity and yield as a green powder which dissolved for example in methanol, glacial acetic acid and chlorobenzene to give a green solution.

*Analysis.*—$C_{33}H_{25}ON_3Cl_2$ (549.5):

|  | C | H | N | Cl |
|---|---|---|---|---|
| Calculated, percent | 72.0 | 4.54 | 7.64 | 12.81 |
| Found, percent | 71.8 | 4.8 | 7.9 | 12.5 |

When using instead of the 1-amino-4-methoxybenzene an equimolecular amount of 1-amino-4-phenoxybenzene or 1-amino-4-phenylaminobenzene and proceeding in the manner described above, the green dyestuff 4-chloro-4'-(p-phenoxyphenylamino) - 4'' - (m - cyanophenylamino)-triphenylmethyl chloride or 4-chloro-4'-(p-phenylaminophenylamino) - 4'' - (m - cyanophenylamino) - triphenylmethyl chloride was obtained in a good yield.

(b) The dyestuff was also prepared by heating for 5 hours at 120° C. 46.85 parts of 4,4'-dichloro-4''-(p-methoxyphenylamino)-triphenylmethyl chloride with 14.7 parts of aluminum chloride and 23.6 parts of 3-aminobenzonitrile.

The 4,4' - dichloro - 4'' - (p-methoxyphenylamino)-triphenylmethyl chloride was obtained by heating for 5 hours at a temperature ranging from 50° C. to 60° C. 52 parts of 4,4',4''-trichloro-triphenylmethyl-tetrachloroaluminate, 24.6 parts of 1-amino-4-methoxybenzene and 30 parts by volume of chlorobenzene. After cooling, the red melt was mixed with 150 parts by volume of petroleum ether, the precipitated dyestuff was suction-filtered and boiled with dilute hydrochloric acid. The 4,4'-dichloro - 4'' - (p - methoxyphenylamino)-triphenylmethyl chloride was obtained in an almost quantitative yield in the form of a violet powder which dissolved in methanol and glacial acetic acid to give a red solution.

*Analysis.*—$C_{26}H_{20}ONCl_3$ (468.5):

|  | N | OCH$_3$ |
|---|---|---|
| Calculated, percent | 2.95 | 6.62 |
| Found, percent | 3.2 | 6.9 |

*Example 5*

45 parts of the boron trifluoride complex compound of the 4,4',4''-trichloro-triphenylmethyl chloride which was prepared from 4,4',4''-trichloro-triphenylmethyl chloride and boron trifluoride, 16.5 parts of 4-aminobenzoic acid ethyl ester and 70 parts by volume of chlorobenzene were heated for 5 to 6 hours at a temperature ranging from 50° to 60° C. To the deep red solution 32.2 parts of 3-aminobenzotrifluoride were added and the mixture was then heated for 5 hours at a temperature ranging from 115° to 120° C. After a processing as described in Example 1a, the dyestuff 4-chloro-4'-(p-carbethoxyphenylamino) - 4'' - (m - trifluoromethylphenylamino) - triphenylmethyl chloride was obtained in a very good yield and purity in the form of a green powder.

When using instead of the 4-aminobenzoic acid ethyl ester an equimolecular amount of 3-aminobenzoic acid methyl ester, the 4-chloro-4'-(m-carbomethoxyphenylamino - 4'' - (m - trifluoromethylphenylamino) - triphenylmethyl chloride was obtained as a green powder which was easily soluble in methanol and glacial acetic acid.

*Example 6*

(a) 52 parts of 4,4',4''-trichloro-triphenylmethyl-tetrachloroaluminate, 13.8 parts of 1-amino-3-nitrobenzene and 80 parts by volume of nitrobenzene were first heated for 6 hours at 100° C. and, after the addition of 29 parts of 1-aminonaphthalene, stirred for a further 5 hours at 120° C. The green melt was poured into dilute hydrochloric acid and the nitrobenzene was blown off. There was obtained the green dyestuff 4-chloro-4'-(m-nitrophenylamino)-4''-(α-naphthylamino)-triphenylmethyl chloride in a very good yield and excellent purity.

From equimolecular amounts of 1-amino-4-nitrobenzene, there was obtained in the same manner in a very good yield and purity the 4-chloro-4'-(p-nitrophenylamino)-4''-(α-naphthylamino)-triphenylmethyl chloride as a green powder which was easily soluble in methanol and glacial acetic acid.

(b) 48.35 parts of 4,4'-dichloro-4''-(m-nitrophenylamino)-triphenylmethyl chloride, 14.6 parts of aluminum chloride, 29 parts of 1-naphthylamine and 100 parts by volume of nitrobenzene were heated for 5 to 6 hours at 120° C. and worked up as described above.

*Analysis.*—$C_{35}H_{25}O_2N_3Cl_2$ (590):

|  | C | H | N | Cl |
|---|---|---|---|---|
| Calculated, percent | 71.2 | 4.23 | 7.12 | 12.02 |
| Found, percent | 69.9 | 4.6 | 7.4 | 11.95 |

For preparing the red 4,4'-dichloro-4''-(m-nitrophenylamino)-triphenylmethyl chloride, 52 parts of 4,4',4''-trichlorotriphenylmethyl - tetrachloroaluminate were condensed for 5 to 6 hours, at 100° C., with 13.8 parts of 1-amino-3-nitrobenzene and 80 parts by volume of nitrobenzene, the red melt so obtained was poured into dilute hydrochloric acid and the nitrobenzene was eliminated by distillation. The brown resin obtained was the 4,4'-dichloro - 4" - (m-nitrophenylamino)-triphenylmethyl carbinol which was converted into the 4,4'-dichloro-4"-(m-nitrophenylamino)-triphenylmethyl chloride by heating it for several hours with thionyl chloride in petroleum ether. The perchlorate corresponding to the chloride crystallized in the form of felted small violet needles.

Analysis.—$C_{25}H_{17}O_6N_2Cl_3$ (547.5):

|  | C | H | N | Cl |
|---|---|---|---|---|
| Calculated, percent | 54.8 | 3.1 | 5.12 | 19.4 |
| Found, percent | 54.6 | 3.1 | 5.1 | 19.6 |

Example 7

60.45 parts of 4-chloro-4',4"-dibromo-triphenylmethyl-tetrachloroaluminate, which was prepared from 4-chlorobenzotrichloride, bromobenzene and aluminum chloride as described in Example 1b, 17.2 parts of 3-aminobenzenesulfonamide and 75 parts by volume of tetrachloroethane were heated for 5 to 6 hours at a temperature ranging from 90° to 100° C. 24.5 parts of 1-amino-4-bromobenzene were then added and the mixture was stirred for 5 hours at a temperature ranging from 120° C. to 130° C.

After blowing off the solvent and boiling with dilute hydrochloric acid, the dyestuff 4-chloro-4'-(m-sulfamidophenylamino)-4"- (p-bromophenylamino)-triphenylmethyl chloride was obtained in a very good yield and purity in the form of a green powder which was easily soluble in methanol and glacial acetic acid.

When using instead of the 3-aminobenzenesulfonamide equimolecular amounts of 4-aminobenzenesulfanilide and proceeding in the manner described above, the green dyestuff 4-chloro-4' - (p-sulfanilidophenylamino) - 4" - (p-bromophenylamino)-triphenylmethyl chloride was obtained in a very good yield.

Example 8

64.8 parts of 4,4',4"-tribromo-triphenylmethyl-tetrachloro-aluminate were suspended in 80 parts by volume of chlorobenzene and, after the addition of 14.25 parts of 1-amino-3-methyl-5-chlorobenzene, the suspension was heated for 5 to 6 hours at 100° C. 21.5 parts of 2-aminotoluene were then added and the mixture was stirred for a further 6 hours at 130° C. The green bronzing melt was mixed with dilute hydrochloric acid and the chlorobenzene was blown off. After suction-filtration and drying, the green dyestuff 4-bromo-4'-(3-methyl-5-chlorophenylamino) - 4" - (o-methylphenylamino)-triphenylmethyl chloride was obtained in a very good yield and purity which dissolved in methanol and glacial acetic acid to give a green solution.

When using instead of chlorobenzene dichlorobenzene or trichlorobenzene or mixtures of mono-, dichloro- and trichlorobenzene and operating in the manner described above, the dyestuff was obtained in an equal yield and purity.

Example 9

12.8 parts of 1-amino-4-chlorobenzene were dissolved in 60 parts by volume of chlorobenzene. After the addition of 60.4 parts of 4-chloro-4',4"-dibromo-triphenylmethyl-tetrachloroaluminate prepared from 4-chlorobenzotrichloride, bromobenzene and aluminum chloride according to Example 1b, the mixture was stirred for 7 hours at 110° C. 34.2 parts of 1-amino-3-bromobenzene were then added and the mixture was heated for a further 7 to 8 hours at a temperature ranging from 125° C. to 130° C. A green bronzing melt was obtained which, after separation of the chlorobenzene and boiling with dilute hydrochloric acid, yielded a powder which dissolved in methanol, glacial acetic acid, chlorobenzene and similar solvents to give a yellow-green solution. This powder was the 4-chloro-4'-(p-chlorophenylamino)-4"-(m - bromophenylamino)-triphenylmethyl chloride and was obtained in an almost quantitative yield.

When using instead of the 1-amino-3-bromobenzene an equimolecular amount of 1-amino-4-fluorobenzene and proceeding in the manner described above, the green dyestuff 4-chloro-4'-(p-chlorophenylamino) - 4"-(p-fluorophenylamino)-triphenylmethyl chloride was obtained in an equally good yield.

Example 10

26 parts of 4,4',4"-trichlorotriphenylmethyl-tetrachloroaluminate, 8.25 parts of 3-aminobenzoic acid ethyl ester and 100 parts by volume of tetrachloroethane were heated for 5 hours at 120° C. To the intensely red colored melt were added 20.5 parts of 4-aminosulfonic acid methyl ester and the temperature was maintained for 2 further hours at 130° C. to 135° C. The green melt was then poured into dilute hydrochloric acid and the tetrachloroethane was blown off with steam. The dyestuff 4-chloro - 4' - (m-carbethoxyphenylamino)-4"- (p-sulfone-methoxyphenylamino) - triphenylmethyl chloride was obtained in a good yield and purity and dissolved very easily in organic solvents.

We claim:
1. An unsymmetrical dyestuff having the formula

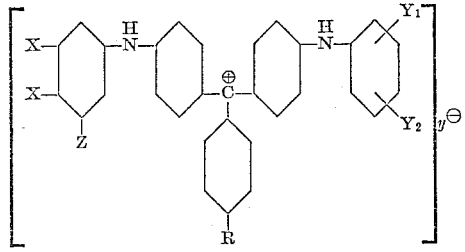

wherein one X stands for hydrogen and the other X stands for a member of the group consisting of a halogen atom, a lower alkyl, a lower alkoxy, phenoxy, phenylamino, nitro, sulfonamide, sulfanilide, and carboxylic acid lower alkyl ester group, Z represents a member of the group consisting of hydrogen and a halogen, R represents a halogen atom, $Y_2$ stands for a member of the group consisting of hydrogen, a halogen, a lower alkyl group, β-hydroxyethylsulfonyl group, cyano, sulfonic acid lower alkyl ester group and trifluoromethyl, $Y_1$ is hydrogen, and $Y_1$ and $Y_2$ together with the phenyl form α-naphthyl, and $y^\ominus$ represents a member of the group consisting of a chloride, bromide and iodide ion.

2. The dyestuff having the formula

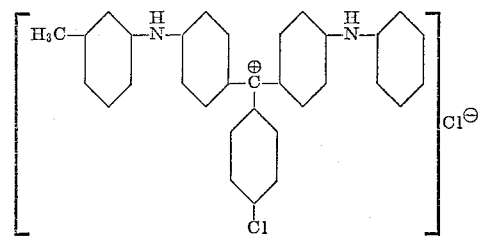

3. The dyestuff having the formula

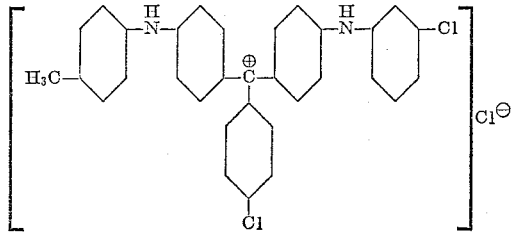

4. The dyestuff having the formula

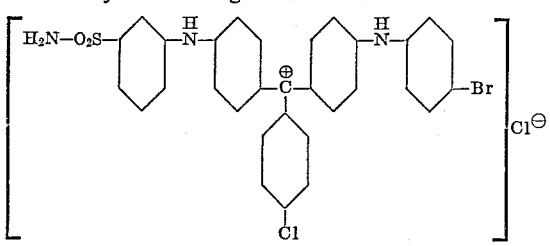

5. The dyestuff having the formula

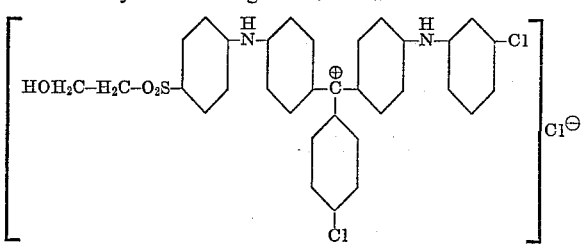

6. The dyestuff having the formula

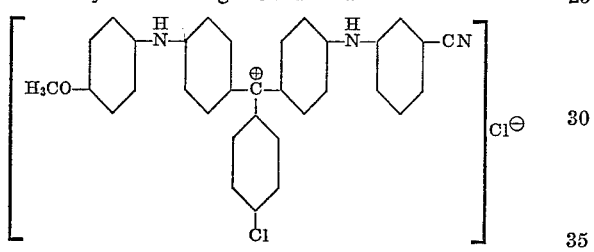

7. A process which comprises condensing one mol of a complex compound consisting of a 4,4',4''-trihalogentriphenylmethyl halide and a compound of the group consisting of aluminum chloride, iron(III)-chloride and boron trifluoride, with one mol of an amine having the formula

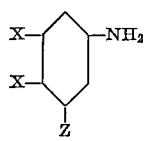

in which one X stands for hydrogen and the other X stands for a member of the group consisting of a halogen atom, a lower alkyl, a lower alkoxy, phenoxy, phenylamino, nitro, sulfonamide, sulfanilide, and carboxylic acid lower alkyl ester group, and Z represents a member of the group consisting of hydrogen and a halogen in the presence of an inert organic solvent at a temperature in the range of from about 80° to 130° C. and condensing the complex 4,4'-dihalogen-4''-phenyl-amino-triphenylmethane compound so obtained with two mols of a different amine having the formula

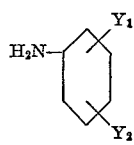

in which $Y_2$ represents a member of the group consisting of hydrogen, a halogen, a lower alkyl group, β-hydroxyethylsulfonyl group, cyano, sulfonic acid lower alkyl ester group and trifluoromethyl, and $Y_1$ is hydrogen, and $Y_1$ and $Y_2$ together with the phenyl form α-naphthyl at a temperature in the range of from about 120° to 130° C., and hydrolyzing the complex compound so obtained with an aqueous hydrohalic acid to prepare an unsymmetrical dyestuff having the formula

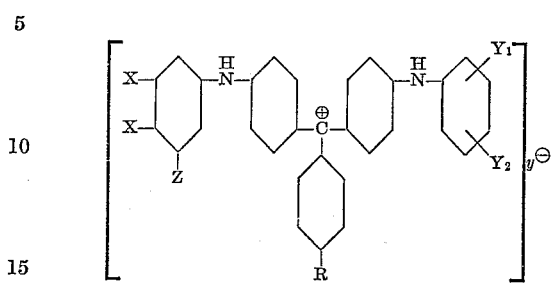

in which X, Z, $Y_1$ and $Y_2$ are as defined above, R represents a halogen atom and $y^\ominus$ stands for a member of the group consisting of a chloride, bromide and iodide ion.

8. A process which comprises condensing one mol of a complex compound consisting of a 4,4',4''-trihalogentriphenylmethyl halide and a compound of the group consisting of aluminum chloride, iron(III)-chloride and boron trifluoride, with two mols of an amine having the formula

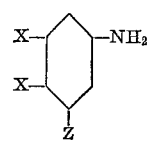

in which one X stands for hydrogen and the other X stands for a member of the group consisting of a halogen atom, a lower alkyl, a lower alkoxy, phenoxy, phenylamino, nitro, sulfonamide, sulfanilide, and carboxylic acid lower alkyl ester group, and Z represents a member of the group consisting of hydrogen and a halogen in the presence of an inert organic solvent at a temperature in the range of from about 30° to 80° C., hydrolyzing the 4,4'-dihalogen-4''-monophenylamino - triphenylmethyl halide with an aqueous hydrohalic acid, removing the inert organic solvent, condensing one mol of the 4,4'-dihalogen-4''-monophenylamino-triphenylmethyl halide so obtained with one mol of a compound of the group consisting of aluminum chloride, iron(III)-chloride and boron trifluoride and with two mols of a different amine having the formula

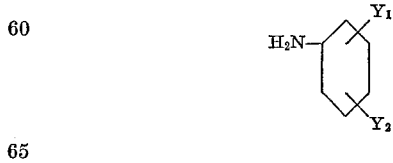

in which $Y_2$ represents a member of the group consisting of hydrogen, a halogen, a lower alkyl group, β-hydroxyethylsulfonyl group, cyano, sulfonic acid lower alkyl ester group and trifluoromethyl, and $Y_1$ is hydrogen, and $Y_1$ and $Y_2$ together with the phenyl form α-naphthyl at a temperature in the range of from about 120° to 130° C. in the presence of an inert organic solvent and hydrolyzing the complex compound so obtained with an aqueous hydrohalic acid to prepare an unsymmetrical dyestuff having the formula

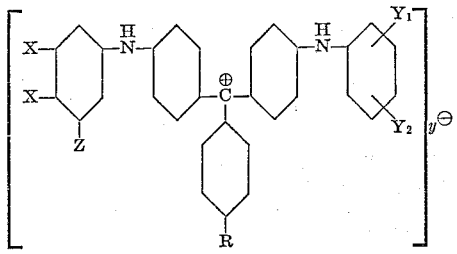

in which X, Z, $Y_1$ and $Y_2$ are as defined above, R represents a halogen atom and $y^\ominus$ stands for a member of the group consisting of a chloride, bromide and iodide ion.

9. The process as claimed in claim 7, wherein the reaction is carried out in the presence of a member of the group consisting of chlorobenzene, dichlorobenzene, trichlorobenzene, tetrachloroethane, nitromethane and nitrobenzene and mixtures thereof.

10. The process as claimed in claim 7, wherein the hydrolyzing of the complex compounds obtained is effected with aqueous hydrochloric acid.

References Cited by the Examiner

UNITED STATES PATENTS

| | | | |
|---|---|---|---|
| 1,890,154 | 12/32 | Ingram | 260—393 XR |
| 2,755,203 | 7/56 | Stallmann | 260—393 XR |

FOREIGN PATENTS

| | | |
|---|---|---|
| 535,718 | 8/55 | Belgium. |
| 1,098,652 | 2/61 | Germany. |

LORRAINE A. WEINBERGER,
*Acting Primary Examiner.*

LEON ZITVER, *Examiner.*